(12) United States Patent
Barton

(10) Patent No.: US 7,430,517 B1
(45) Date of Patent: Sep. 30, 2008

(54) SYSTEM AND METHOD FOR MARKETING OVER COMPUTER NETWORKS

(75) Inventor: Timothy A. Barton, Overland Park, KS (US)

(73) Assignee: Freightquote.com, Inc., Lenexa, KS (US)

( * ) Notice: Subject to any disclaimer, the term of this patent is extended or adjusted under 35 U.S.C. 154(b) by 0 days.

(21) Appl. No.: 09/557,822

(22) Filed: Apr. 25, 2000

Related U.S. Application Data

(63) Continuation-in-part of application No. 09/303,788, filed on Apr. 30, 1999, now abandoned.

(51) Int. Cl.
  *G06F 9/44* (2006.01)
  *G07B 15/00* (2006.01)
(52) U.S. Cl. ............................. 705/7; 705/13
(58) Field of Classification Search ............ 705/7, 705/10, 13, 14
  See application file for complete search history.

(56) References Cited

U.S. PATENT DOCUMENTS 6,539,360 B1 * 3/2003 Kadaba ............... 705/28

2003/0014318 A1 * 1/2003 De La Motte et al. ......... 705/26

OTHER PUBLICATIONS

Viking Freight, "Viking Rate Request", web-site www.vikingfreight.com modified Jun. 8, 1998, 2 pages.*
UPS Web Site, dated Apr. 17, 1999, as found via www.archives.org, 9 pages.*
FedEx web site, scanned Jan. 12, 1998 on www.archive.org, www.archive.org/web/19980112195626/www.fedex.com, 13 pages.*
Business Wire, "Federal Express delivers shipping to the WorldWide Web; Businesses laud On-Line shipping as convenient an useful service," Jul. 16, 1996, 2 pages.*
Viking Freight web site, scanned Feb. 22, 1999 on www.archive.org, www.archive.org/web/19990222120028/www.ikingfreight.com/online.htm, 4 pages.*
Definitions of "Web Page" and "Web Site" from Computer Dictionary, Microsoft Press, 3rd Edition, 1997, p. 506.*

* cited by examiner

*Primary Examiner*—Marc E Norman
(74) *Attorney, Agent, or Firm*—Nira, Scavone, Haller & Niro

(57) ABSTRACT

A network-based marketing system is disclosed which allows users to obtain real-time, single-source LTL freight services. These services may be branded by an affiliation. The services are preferably provided over the Internet, and accessed via web browser software in the form of web pages automated by a web server and database server. The invention permits the user to receive rates for LTL freight in real-time, schedule, track and invoice shipments via a distributed network.

3 Claims, 24 Drawing Sheets

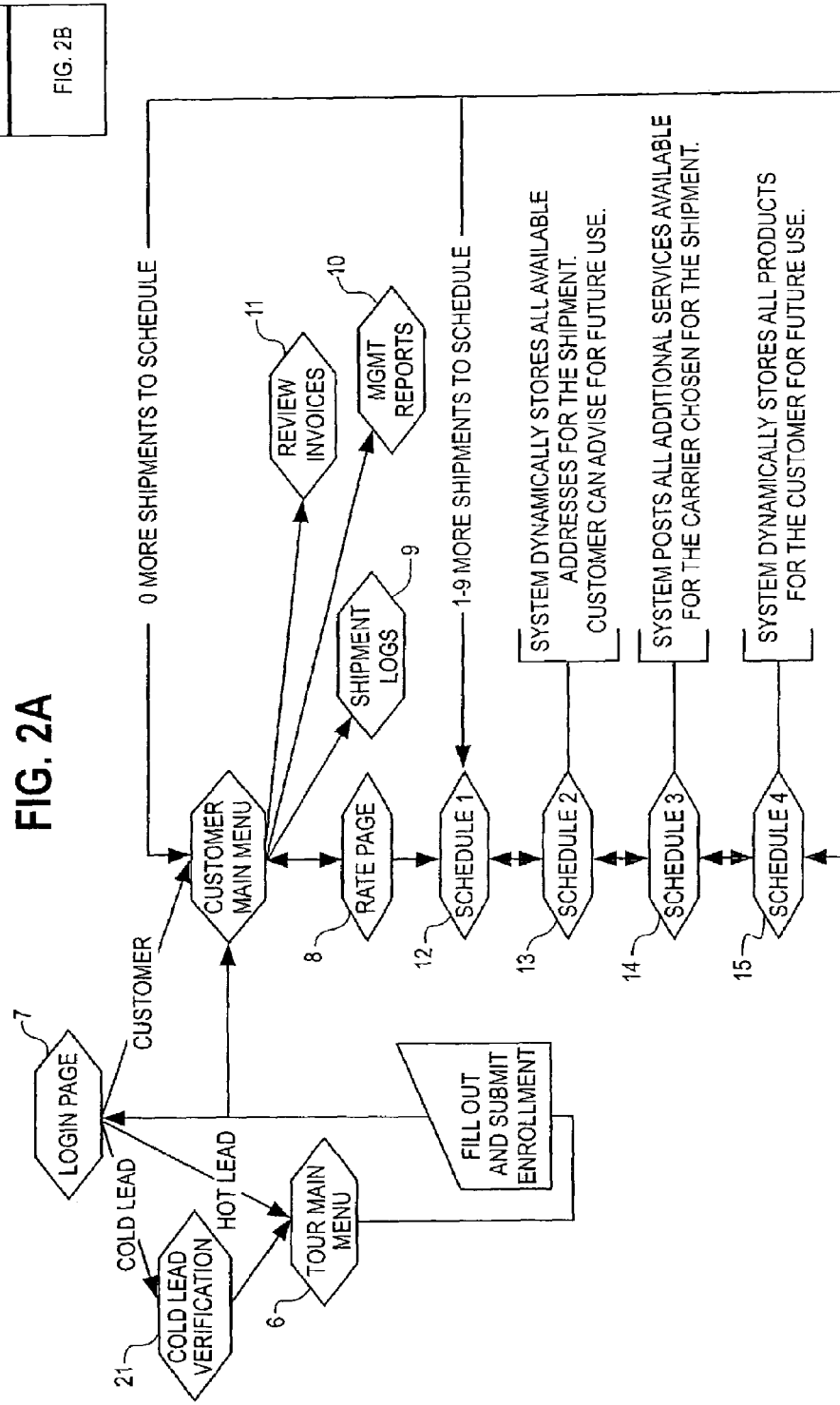

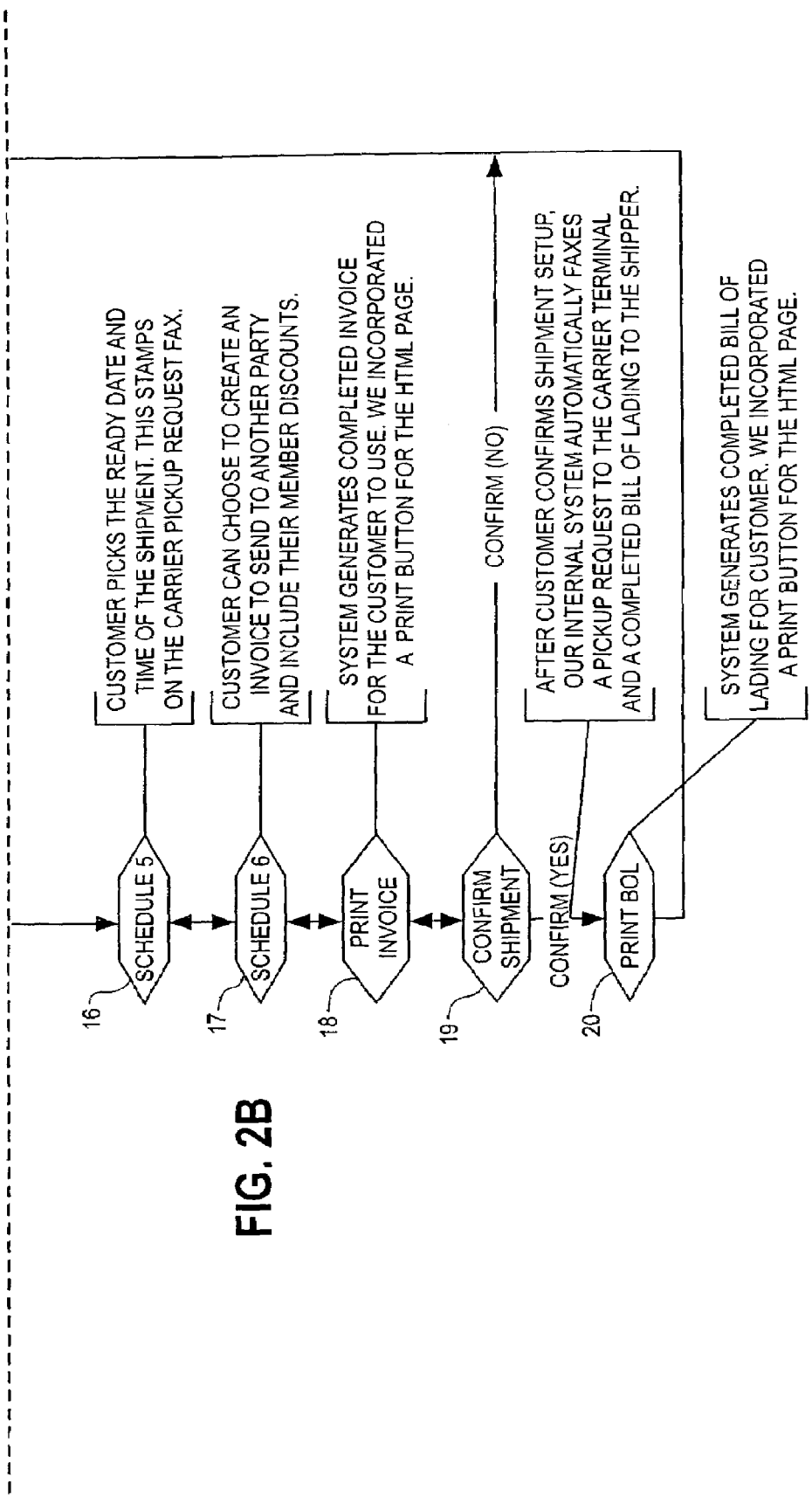

FIG.5

Association Member Benefits ~24

Rate your LTL Shipments

| | Origin Zip | Dest. Zip | Class | Total Wt. | Member Price ~35 | Carrier SCAC ~36 | Est. Transit (days) ~37 | Arrange pickup ~38 |
|---|---|---|---|---|---|---|---|---|
| 1. | 66202 | 55125 | 70 | 1251 | $185.03 | CFWY | 1 | ⊙Yes ○No |
| 2. | 94544 | 66202 | 50 | 5230 | $713.18 | CFWY | 3 | ⊙Yes ○No |
| 3. | 94544 | 85024 | 70 | 3212 | $431.64 | CRNT | 1 | ○Yes ⊙No |
| 4. | 33124 | 64111 | Multiple ▶ | 810 | $165.86 | ODFL | 2 | ⊙Yes ○No |
| 5. | | | | | Rate ~34 | | | ○Yes ○No |
| 6. | | | | | | | | ○Yes ○No |
| 7. | | | | | | | | ○Yes ○No |
| 8. | | | | | | | | ○Yes ○No |
| 9. | | | | | | | | ○Yes ○No |
| 10. | | | | | | | | ○Yes ○No |

~30 ~31 ~32 ~33  ~39

When you have completed rating all of your shipments and selected the shipments for pickup arrangement, click here.

[ Next >> ] ~40

FIG. 8

Association Member Benefits

Schedule Your LTL Shipments

| Shipment 1 of 3 | |
|---|---|
| Carrier SCAC: | ODFL |
| Origin Zip: | 66202 |
| Destination Zip: | 55125 |
| Total Weight: | 1252 |
| Class: | 100 |
| Your Freight Cost: | $368.67 |
| Additional Fees: | $.00 |
| Total Cost: | $368.67 |
| Est. Transit (days) | 1 |
| Carrier Name: | Old Dominion Freight Line |

[4] Choose or Create Product Description for each product being shipped for this movement. A NMFC# is required for each product. Choose (Add a Product) from the Product Description drop down box if you wish enter new product information.

| | Product Description | Class | Weight | NMI C# | HZMT | PKG Type | # of PKGs |
|---|---|---|---|---|---|---|---|
| 1. | Steel Plates ▽ | 100 | 1252 | 12345-02 | ☐ | Pallet ▽ / Pallet ▽ / Crate ▽ / Box ▽ / Roll ▽ | 2 |

BACK    NEXT

FIG. 9

Association Member Benefits

Schedule Your LTL Shipments

Shipment 1 of 3

| | |
|---|---|
| Carrier SCAC: | ODFL |
| Origin Zip: | 66202 |
| Destination Zip: | 55125 |
| Total Weight: | 1252 |
| Class: | 100 |
| Your Freight Cost: | $368.67 |
| Additional Fees: | $.00 |
| Total Cost: | $368.67 |
| Est. Transit (days) | 1 |
| Carrier Name: | Old Dominion Freight Line |

[6] Will you be invoicing another party for this shipment after you are billed from freightquote? If yes, this system can create your freight invoice. You can either include or exclude your member discounts to your customer. Please complete A, B, and C.

[A] Would you like to print an invoice of this shipment to send to another company?
⊙ Yes  ○ No

[B] Did you wish to pass on your member discounts to this company?
○ Yes  ⊙ No

| Your Member Discounted Rate | Normal Discounted Rate |
|---|---|
| $368.67 | $405.53 |

[C] Who is the company you will be invoicing at a later date?

| | |
|---|---|
| Company: | Williams Distribution |
| Street Address 1: | 200 W. 234th Street Suite 7502 |
| City, ST. Zip: | New York / NY / 21250 |
| Phone: | 212 555 2550   Fax: 212 555 3000 |
| Contact Name: | Mary Jenkins |
| Your Reference #: | ABC12321 |

BACK   NEXT

FIG. 11

Association Member Benefits

Press OK to complete this shipment and print Bill Of Lading (BOL).

1. If you are not the sender, please notify them regarding this movement and fax a copy of the completed Bill of Lading to the sender. The sender must use our generated Bill of Lading (BOL) in order for you to receive accurate pricing and shipment processing.

2. The carrier will pick up your freight within 48 hours of the scheduled Ready Date and Time. You do not need to contact the carrier for pickup.

3. We will invoice you at the end of the month for this movement. If any freight information changes for this movement, additional freight charges or fees may be added to this movement's cost after shipment auditing (1-4 weeks).

Cancel Movement

Use button below to print three copies of this Bill of Lading. Your driver must use this Bill of Lading to insure accurate shipment processing.

BOL # 10006

Shipper Information
- Shipper Name: ABC Company
- Street Addr 1: 585 Main Street
- Street Addr 2: N/A
- City, ST, Zip: Anytown, KS 66202
- Phone: 9135555585
- Contact Name: John Smith
- Ref: N/A
- PO#: N/A Receiver Information
- Receiver Name: Williams Distributor
- Street Addr 1: 600 N. Kentucky Avenue
- Street Addr 2: (loading dock)
- City, ST, Zip: saint paul, MN 55125

FROM:

Bill Third Party To:
FREIGHTQUOTE, LLC
10100 SANTA FE DR.
SUITE 100
OVERLAND PARK, KS 66212

Bill Charges To:
PREPAID / BILL THIRD PARTY ONLY

Special Instructions:

Don't forget to print 3 copies of the BOL (give 2 to the driver)

[Print BOL] — 73
[NEXT] — 74

1. Print Bill of Lading (BOL) by clicking here. Keep one for your records.
2. Give two copies to the driver.
3. Thank you for using freightquote.com. Click here to continue.

FIG. 13

Association Member Benefits ⌐24

| Inv# | Inv Date | Due Date | Prior Bal | New Charges | Payments/Crdts | Total Due |
|---|---|---|---|---|---|---|
| 123456 | 2/28/1999 | 3/20/1999 | 0 | 252.12 | 0 | 252.12 |
| 145678 | 3/31/1999 | 4/20/1999 | 252.12 | 558.15 | 252.12 | 558.15 |
| 156789 | 4/30/1999 | 5/20/1999 | 558.15 | 1020.60 | 500.00 | 1079.62* |
| 178922 | 5/31/1999 | 6/20/1999 | 1079.62 | 1150.50 | 1079.62 | 1150.50 |
| 165678 | 6/30/1999 | 7/20/1999 | 252.12. | 558.15 | 252.12. | 558.15 |
| 176789 | 7/31/1999 | 8/20/1999 | 1079.62 | 1150.50 | 1079.62 | 1150.50 |

*Includes a 1.5% finance charge added to unpaid prior balance

FIG. 14

Association Member Benefits ⌐24

Click on the column you wish to arrange your shipments by. Highlight the desired shipment and click Print BOL (Bill of Lading), or Print POD (Proof of Delivery).

| BOL Number | SCAC | Status | Picked UP | Delivered | Signed By | Time |
|---|---|---|---|---|---|---|
| 1234567800001 | AMER | PENDING | 4/03/1999 | | | |
| 1234567800002 | ODFL | PENDING | 4/04/1999 | | | |
| 1234567800003 | CFWY | IN TRANSIT | 4/02/1999 | | | |
| 1234567800004 | CFWY | IN TRANSIT | 4/02/1999 | | | |
| 1234567800005 | AMER | DELIVERED | 3/15/1999 | 3/17/1999 | J SMITH | 13:45 |
| 1234567800006 | DAFG | DELIVERED | 3/02/1999 | 3/05/1999 | R JOHNSON | 13:45 |

Print BOL —84  Print POD —85

FIG. 15

Click on the report you wish to run. Autorun Reports are highlighted in Blue (you will automatically receive these reports).

| Shipments To Be Invoiced | Shipments Already Invoiced | Create Autorun Reports |
|---|---|---|
| Cost Report: To/From Specified Locations (86) | Cost Report: To/From Specified Locations (87) | AUTORUN Cost Report: To/From Specified Locations (88) |
| Tracking Report: Shipment Transit Status (89) | Tracking Report: Shipment Transit Status (90) | AUTORUN Tracking Report: Shipment Transit Status (91) |
| CREATE CUSTOM REPORT (92) | CREATE CUSTOM REPORT (93) | AUTORUN CREATE CUSTOM REPORT (94) |

FIG. 15A

Run Cost Report

Report 1: Zip Code Range

| | Origin | | Destination | |
|---|---|---|---|---|
| Locations | 66212 —87A | to | ALL | —87B |

| | Start | | Stop | |
|---|---|---|---|---|
| Date Range | 1/1/1999 | to | 1/31/1999 | —87D |
| | —87C | | | |

87E { ⊙ Email    to    jsmith@abc-company.net —87F

○ Fax    to    _____ —87G

[ Submit ] —87H     [ Reset ] —87I

FIG. 15B

Report Name: Billing Summary       Report Date: 3-May-99
     from: 1-Jan-99    to    31-Jan-99

Report on: Master Account       Report to: Master Account
ABC Company                                    ABC Company
123 South Main Street                123 South Main Street
Overland Park, KS 66212           Overland Park, KS 66212

|    | BOL#   | Ship Date | Delivered | Weight | Cost     |
|----|--------|-----------|-----------|--------|----------|
| 1. | 100001 | 1/1/99    | 1/4/99    | 120    | $68.50   |
| 2. | 100002 | 1/1/99    | 1/4/99    | 100    | $85.23   |
| 3. | 100003 | 1/1/99    | 1/4/99    | 656    | $122.20  |
| 4. | 100004 | 1/5/99    | 1/8/99    | 230    | $51.12   |
| 5. | 100005 | 1/5/99    | 1/8/99    | 58     | $40.00   |
| 6. | 100006 | 1/10/99   | 1/14/99   | 502    | $98.90   |
| 7. | 100007 | 1/10/99   | 1/14/99   | 650    | $225.25  |
| 8. | 100008 | 1/10/99   | 1/15/99   | 250    | $100.20  |
| 9. | 100009 | 1/11/99   | 1/15/99   | 120    | $68.50   |
| 10.| 100010 | 1/15/99   | 1/19/99   | 50     | $60.20   |
| 11.| 100011 | 1/15/99   | 1/23/99   | 220    | $122.20  |
| 12.| 100012 | 1/23/99   | 1/25/99   | 262    | $51.90   |
| 13.| 100013 | 1/23/99   | 1/26/99   | 120    | $64.50   |
| 14.| 100014 | 1/23/99   | 1/26/99   | 85     | $85.82   |
| 15.| 100015 | 1/23/99   | 1/29/99   | 1252   | $321.01  |
| 16.|        |           |           |        |          |
| 17.|        |           |           |        |          |
| 18.|        |           |           |        |          |
| 19.|        |           |           |        |          |
| 20.|        |           |           |        |          |

Total Page 1:    $1,565.53

Overall Total:    $1,565.53    Average:    $104.37

FIG. 15C

Run Tracking Report

Report 1: Zip Code Range

|  | Origin | | Destination |
|---|---|---|---|
| Locations | 66212 | to | 55125 |

|  | Start | | Stop |
|---|---|---|---|
| Date Range | 1/5/1999 | to | 1/31/1999 |

⊙ Email   to   jsmith@abc-company.net

○ Fax   to

Submit    Reset

FIG. 15D

Report Name: Transit Summary      Report Date: 6-May-99
    from: 1-Jan-99    to    31-Jan-99

Report on: Affiliate Account
ABC Company
555 Williamsburg Ave
Dayton, OH 55125

Report to: Master Account
ABC Company
123 South Main Street
Overland Park, KS 66212

|    | BOL#   | Ship Date | Delivered | Weight | Transit Days |
|----|--------|-----------|-----------|--------|--------------|
| 1. | 100001 | 1/1/99    | 1/4/99    | 120    | 1            |
| 2. | 100002 | 1/1/99    | 1/4/99    | 100    | 1            |
| 3. | 100003 | 1/1/99    | 1/4/99    | 656    | 3            |
| 4. | 100004 | 1/5/99    | 1/8/99    | 230    | 3            |
| 5. | 100005 | 1/5/99    | 1/8/99    | 58     | 3            |
| 6. | 100006 | 1/10/99   | 1/14/99   | 502    | 3            |
| 7. | 100007 | 1/10/99   | 1/14/99   | 650    | 4            |
| 8. | 100008 | 1/10/99   | 1/15/99   | 250    | 5            |
| 9. | 100009 | 1/11/99   | 1/15/99   | 120    | 4            |
| 10.| 100010 | 1/15/99   | 1/19/99   | 50     | 2            |
| 11.| 100011 | 1/15/99   | 1/23/99   | 220    | 6            |
| 12.| 100012 | 1/23/99   | 1/25/99   | 262    | 1            |
| 13.| 100013 | 1/23/99   | 1/26/99   | 120    | 2            |
| 14.| 100014 | 1/23/99   | 1/26/99   | 85     | 2            |
| 15.| 100015 | 1/23/99   | 1/29/99   | 1252   | 5            |
| 16.|        |           |           |        |              |
| 17.|        |           |           |        |              |
| 18.|        |           |           |        |              |
| 19.|        |           |           |        |              |
| 20.|        |           |           |        |              |

Avg. Transit:     3

SYSTEM AND METHOD FOR MARKETING OVER COMPUTER NETWORKS

This is a continuation-in-part of application Ser. No. 09/303,788 filed Apr. 30, 1999, now abandoned.

FIELD OF THE INVENTION

The invention claimed relates to computer networks, and particularly, to marketing over computer networks and to network marketing and provision of freight trucking services.

BACKGROUND OF THE INVENTION

Historically, less-than-truckload ("LTL") freight trucking services have been rated and scheduled by phone calls to individual carriers or brokers, and confirmatory faxes or letters. As a result, the time involved in obtaining competitive quotes, scheduling the shipments, billing, tracking and confirming shipments has been significant. In addition, invoices, bills of lading and other important documentation have often contained mistakes or errors, leading to further time spent rectifying any problems. Because of the often personal nature of the quotes provided, it has been difficult to obtain accurate quoting services and rapid scheduling, and impossible to obtain a choice of freight trucking services from a single-source real-time network-based solution. In addition, significant errors in billing often occur with respect to accessorial services which include, among others, arrival notification, inside delivery and liftgate services. Often, a customer fails to notify the shipping agent that such services are desired or the shipping agent inputs the incorrect information while taking the order. These types of errors are so pervasive in the shipping industry that entire service companies exist to audit shipping invoices to correct these types of errors. Another error that is common is to enter an incorrect zip code for the delivery location. This again leads to both delivery problems and to billing inaccuracies similar to those described above.

Freight trucking services ordinarily consist of: rating, scheduling, tracking, confirming, and billing. Other related services can also be provided. It is useful to be able to see or generate reports of shipments made or in progress.

Rating the shipment involves providing information to the carrier or broker regarding the origin, destination, and kind of shipping desired. The carrier or broker then determines the rate, often with a negotiated discount, and quotes the rate to the user. The user will then schedule the shipment's pickup and delivery, if the rate is acceptable. It is useful for the user to be able to track the shipment, which is to be able to ascertain the transit status of the shipment once the order has been placed. Tracking services provided to the user are commonly based on a shipment number, which the user must have or look up if the user wishes to track a package. These tracking services allow the user to track single packages, based on the tracking number alone.

If a broker is used, the broker will need to confirm the shipment with the carrier in order to verify that the carrier will have capacity to handle the shipment. Again, this process typically involves telephone calls, faxes, and person-to-person contacts. These contacts lend inefficiency, inaccuracy, and time to an already cumbersome system, but are typically the way freight trucking shipments are rated and scheduled currently.

In freight trucking, volume discounts are often given by carriers in order to induce users to ship with them, and reward repeat business. These discounts can amount to up to 70% of the carrier's base tariffs, and often result in substantial savings to those shippers able to get such discounts. These discounts are not typically available to individual users, other than based on their individual volume of shipments. Sometimes, these volume discounts may be granted to a broker, who may pass a portion of the discount on to the broker's users, or to a group of similarly situated shippers.

A number of network-based shipping services have come into being in recent years. These services, typically, perform the same services provided by a carrier, but over the Internet or other network. Typically, the services provided will be a simple quoting or rating service, along with a scheduling request. No services provide real-time rating and scheduling of shipments or customized branding and reporting by user.

While a number of specialized network-based services have been developed for target markets such as network-based auctioning, retail sales, or grocery shopping, no advanced system for providing general freight shipping services over a network has been developed.

Additionally, existing network-based services generally have a model which is used for providing services. Such a service will be provided with either a single affiliation or a banner advertisement which will be determined randomly at the time a user accesses the service. Hence, a web site or other network-based service will have advertisements or affiliations, but these affiliations and advertisements will be statically determined or based on random selection. In other words, a single web-site or network-based service will appear to be affiliated with only one group or organization, and though it may have a plurality of advertisers, those advertisers may appear as a group or in banner advertisements.

Definition of the Terms

The following terms are used in the claims of the patent as filed and are intended to have their broadest equivalent meaning consistent with the requirements of law.

"Affiliation" or "Association" means an organization or group of which a user may be a member.

"Affinity group" or "affiliation group" means a group with similar interests, such as a professional organization or other group. Any group of users may be referred to as an affinity group or affiliation group.

"Branding" means marking or displaying an affinity or affiliation indication or associating a service with an affinity or affiliation.

"Carrier SCAC" or "SCAC" means or any code or abbreviation used to represent a carrier.

"Carrier information" means any data or information stored in the database regarding the carriers. This may include SCAC, rate information, discount information, markup information, or any other kind of information related to a carrier.

"Customer information or user information" means any data or information stored in the database regarding the customer.

"Customer" means a user who has been registered with the service, and has access to a master account or a sub-account.

"Database" means a collection of information stored in a format which allows searching by a computer, program or user.

"Freight trucking" means land-based shipping of full or partial loads by any shipping vehicle, such as a truck, automobile, panel van, or other shipping vehicle.

"Freight trucking" means shipping performed over land, using trucks, either the entire truck or a portion thereof.

"Freight marketing" means the marketing of freight trucking services.

"HTML" means Hypertext Markup Language.

"LTL shipping" means "less-than-truckload" shipping, or shipping involving any size load, including specifically loads with are less than an entire truckload. This definition is meant to be inclusive rather than exclusive, and also includes loads which are equal to or greater than an entire truckload.

"Marketing" means advertising, selling, providing, or any combination thereof.

"Master Account" means an account on the Service affiliated with a single user. An account will usually include a personal identification, such as a name or code, and a password or PIN. This account will grant access to the Service upon the entry of the personal identification and the password or PIN, though it may involve any kind of mechanism for identification of the user, such as a password or account name alone, or a name paired with a "cookie" provided by the user's computer, or any similar device.

"Network" means any distributed computer network, including, without limitation, both private and public networks, such as IPX networks or the Internet.

"NMFC number" means National Motor Freight Classification number, but may also indicate any code in any system for classifying freight shipments.

"OCR" means optical character recognition.

"PIN" means personal identification number.

"POD" means proof of delivery or proof of delivery form.

"Programs" or "software" means any machine-operable code stored on a computer permitting it to operate or perform a function.

"Quotation" means a price quote for a service, such as a shipment.

"Rating" means quoting a price based on shipment data provided by a customer or user, such as a stated shipment type, origin, and destination.

"Shipper" means the location, entity, user, or person from which a shipment is picked up or sent.

"Sub-account" means a sub-division of a master account. These sub-accounts may be accessible by the Master Account's user through use of a separate password or PIN.

"The service" means the service for providing services related to freight trucking over a distributed network such as the Internet or World Wide Web, or any other distributed network.

"The system" means the computer hardware and software used in providing the service. In the currently preferred embodiment, this includes the server computer.

"The server" means the computer hardware used in providing the service. This may include, as in the currently preferred embodiment, a web server and a database server. The server may also be a single computer or a plurality of computers.

"Carrier" means an individual or organization providing freight shipping services.

"Tracking" means providing information regarding shipment status.

"User" means customer, potential customer, or other person accessing the service.

"Web browser" means any software adapted for accessing web pages or other files over the Internet or a distributed network. Examples of such software are Netscape Navigator and Internet Explorer. Where alternative meanings are possible, the broadest meaning is intended. All words used in the claims are intended to be used in the normal, customary usage of grammar and the English language.

SUMMARY OF THE INVENTION

The invention provides a novel system and method for affiliation of a service provided over a network with a plurality of entities and a novel system and method for providing customized shipping quoting, scheduling, tracking and reporting.

A novel feature of the invention is the custom branding of the services provided with an association, affinity group, or organization logo and name, ascertained from information provided by the user. Any service provided may appear to different customers or users to be provided by or affiliated with different associations, organizations or affinity groups. This feature is novel with respect to all services provided over a distributed network.

The invention allows a user to obtain actual quotes for LTL shipping from a plurality of carriers. The user may then schedule the pick-up and shipment from the shipper of choice, and generate a bill of lading and customer invoice. The user benefits from group or other discounts provided by the service or their affiliation, and may choose the most favorable rate from among a number of shippers, or may choose a favored shipper based on criteria of the user's choice. The user is able to obtain an actual rate, incorporating any discounts, and can see precisely the amount which the user will pay if the user elects to use the shipping service quoted.

The invention maintains a database of carriers, and upon receiving a rating request from a user, queries the database in order to determine which carriers will provide service. The system then determines the rate applicable to each carrier, based on any volume discounts provided and applicable markups, and quotes the rates of all applicable carriers to the user. Once the rating process is completed, the user may choose the carrier it wishes to use for the shipment, and schedule the shipment.

The invention permits the user to select from a plurality of features or accessorial services for the shipping services chosen, such as arrival notification, inside delivery, liftgate services, or others. The charges for these features or accessorial services are automatically calculated and displayed to the user. Moreover, inaccuracies with respect to the accessorial service charges are further reduced by requiring the user to address each accessorial service individually before the user may exit the accessorial page and move further through the system.

The invention permits the user to rate and schedule either a single shipment or a plurality of freight shipments at one time.

Yet another aspect of the present invention is to reduce errors resulting from inputting incorrect zip code information. This may be accomplished by comparing the inputted delivery location zip codes with stored delivery location zip coded used by the shipper in the past to determine, if the zip code information inputted reconciles with locations used in the past.

Another feature of the invention is the ability to customize the interface for each customer or user, permitting the quoting service to recall for the customer or user their prior orders, and data provided earlier by the user. The system dynamically stores shipping addresses and other data for each user, permitting the user to schedule later shipments to or from repeated addresses, bill repeat customers, or perform any repetitive task without requiring the user to supply information again. This feature is novel in the area of freight services marketing over a distributed network, and has numerous novel aspects.

An aspect of the customization is the ability to generate specific management reports, specifically permitting the user to create and run customized reports, which can then be transmitted to the user either over the network, via electronic mail or facsimile. These reports can cover shipment tracking, shipment usage, or other features of the service, can be run both by user request and automatically, and can cover shipments already invoiced and not yet invoiced.

Another aspect of the customization is the ability for each user to maintain sub-accounts for each master account. A user may have multiple sub-accounts for each master account, with each sub-account having its own password or PIN. These accounts may be associated with different employees of the user, different customers of the user, or any categorization which the user desires. This permits the user to restrict access to certain information or to more easily track different uses of the service.

Another aspect of the customization permits the user, once the user has scheduled shipments, to access a tracking report or shipment log of all prior shipments. These shipments may be tracked by the user without reference to a specific shipment number or code, and permits the user to access, both by user and by sub-account, records of all shipments scheduled through the service. Individual shipments may also be tracked without the use of a tracking number or code.

Another aspect of the customization permits a user to access invoices, past and present, including payments and credits. The user may also view payment and credit details on a monthly basis. Another aspect of the service permits the user to maintain and utilize a database of NMFC numbers for the products shipped, allowing the user to accurately rate and schedule shipments based on both standard product descriptions and their own customized product descriptions, with appropriate NMFC numbers provided automatically by the system.

Another aspect of the service permits the user to create and print invoices for the user's own customers. These invoices may be printed while the user is accessing the service upon scheduling a shipment. The service stores customer information for each user, which the user may access for repeat shipments. The invoices are custom-generated for the user, and the system permits the user to add their cost to the cost of the freight, thereby permitting a completely custom invoice. The invoices are printed on a ready-to-mail form for the convenience of the user.

Another aspect of the invention is automated pickup confirmation. The system either electronically notifies or faxes the carrier chosen by the user with an automatically generated pickup confirmation request. The fax request contains checkboxes for the carrier to mark, indicating whether the carrier will be able to handle the shipment or not. The carrier then faxes the request back to the service. The service automatically recognizes the pickup confirmation request using OCR software and updates the system automatically to reflect the carrier's reply. The user may access the system at any time to determine whether or not the user's shipment has been accepted, and track the shipment's status.

The system will also permit the user to print a Bill of Lading. In addition, if the user is not the shipper, the system can automatically fax a Bill of Lading and pickup instructions to the shipper.

The entire process of rating and scheduling a shipment may be performed by the user via access to the system. No telephone calls need be made, no confirmatory faxes or letters are sent by the user. The user can rate, schedule, bill and track an entire shipment through access to the system, and generate custom reports regarding the user or any sub-accounts regarding the use of the system. Thus, the invention is a single-source, network-based solution for marketing freight trucking services.

BRIEF DESCRIPTION OF THE DRAWINGS

FIG. 2 shows an overall flowchart of the service, from a user's point of view.

FIG. 5 shows the rating page for a web-based version of the invention.

FIG. 8 shows the product description page for a web-based version of the invention.

FIG. 9 shows the third-party invoice page for a web-based version of the invention.

FIG. 11 shows the complete shipment page for a web-based version of the invention.

FIG. 12 shows a sample Bill of Lading.

FIG. 13 shows the invoice inquiry page for a web-based version of the invention.

FIG. 14 shows the shipment tracking page for a web-based version of the invention.

FIG. 15 shows the customized reports page for a web-based version of the invention.

FIG. 15A shows a run cost report page for a web-based version of the invention.

FIG. 15B shows a sample cost report.

FIG. 15C shows a run tracking report page for a web-based version of the invention.

FIG. 15D shows a sample tracking report.

DETAILED DESCRIPTION OF THE PREFERRED EMBODIMENTS

Set forth below is a description of what is currently believed to be the preferred embodiment or best example of the invention claimed. Future and present alternatives and modifications to this preferred embodiment are contemplated. Any alternatives or modifications which make insubstantial changes in function, in purpose, in structure or in result are intended to be covered by the claims of the patent.

The invention's preferred embodiment currently is a web site, and may best be understood in terms of use over the Internet. It can readily be seen, however, that the essential design of the system and the services provided by it do not require the use of a web site over the Internet, but may be implemented through the use of any server over any network, including the Internet, an IPX network, or any distributed network of computers with access to a server or computer on which the system operates. The system providing the services of the invention may comprise a number of computers, such as a web server and a database server, or a single computer performing all of the functions of the invention, so long as the user may access the functions over a network.

The present preferred embodiment of the system is the preferred embodiment given the present technology available and the kinds of networks currently in popular use, and is not meant to restrict the specification or practice of the invention in any way by reference to a specific kind of network, server, computer, or operating system. Equivalent computers, networks, or operating systems are expressly contemplated by the invention, and could be used to practice the invention.

Figure 1:
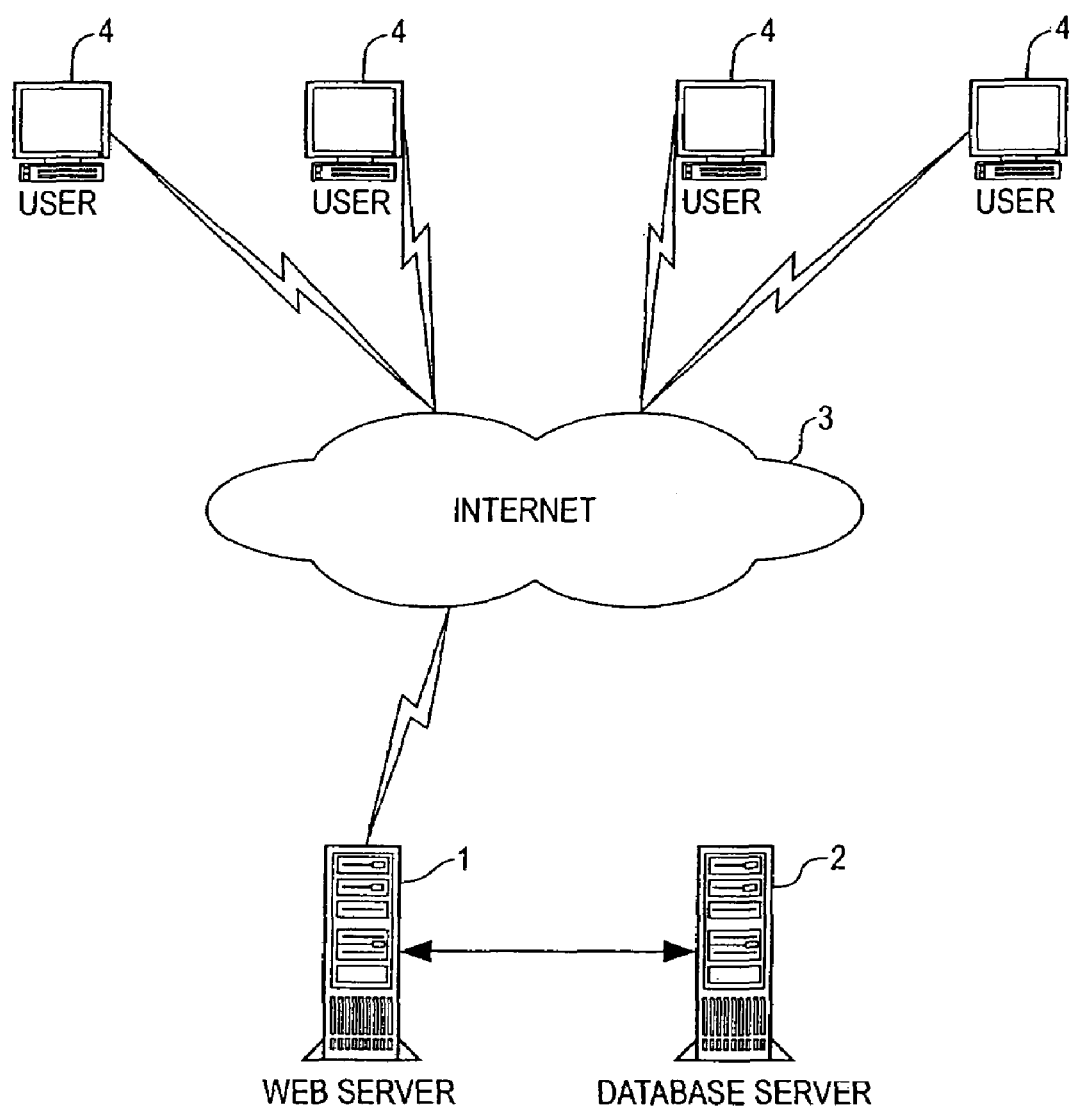
FIG. 1 shows an overview of the system, including the user computer, a network, and the service's server computers.

In FIG. 1, the overview of the system is shown. The system server, including web server 1 and database server 2, permits users to access the services over the Internet 3 from any user computer 4 connected to the Internet. This connection may be via modem, DSL, Ethernet or any other connection. The user connects to web server 1 using the web browser of their choice. Examples of such browser programs are Netscape Navigator or Microsoft's Internet Explorer. It can readily be seen that access may also be by dedicated connection or direct dial-in, or any web browser software could be used to access the server in an alternate embodiment. In the present embodiment, it is preferred to use Internet Explorer or Netscape Navigator, which are the two most popular browsers in common use at the present time. Web server 1 is itself connected to database server 2, which performs the storage, query, and lookup functions of the invention. It can readily be seen that a single, more powerful computer could perform the functions of both web server 1 and database server 2, or that more than two computers may be used to perform the functions of the service. Any of user computer 4, web server 1, or database server 2 may also be protected by a firewall or other device without affecting the invention, so long as the system server is accessible by the user computer. The database may be kept and required lookup functions performed via a variety of common web and database server programming methods. Individual lookup or searches of the database are not described in this description, as they are easily within the scope of one of ordinary skill in the art. The currently preferred embodiment of the invention uses Oracle 8.0 database software and Microsoft's Internet Information Server web server, but any similar server and database software may be used, and custom written software may be used in order to practice the invention. The use of any specific software or lookup table is not meant to limit the scope of the invention, but only as an example of the currently preferred embodiment. It is worth mention that the use of a web server and a database server or their equivalents are well known in the art, and where the specification calls for the database server, the web server, or the system, to perform a function without further description, the actual operation or programming of the system to perform the action or function described is well known in the art, and will be readily apparent to one skilled in the art. In the currently preferred embodiment, the servers used are as described, and the web pages themselves are programmed in HTML. Oracle is used to maintain the database of information, which permits the service's operators or administrators to alter the customer information, carrier information, rate information and other information stored within the database.

Figure 3:
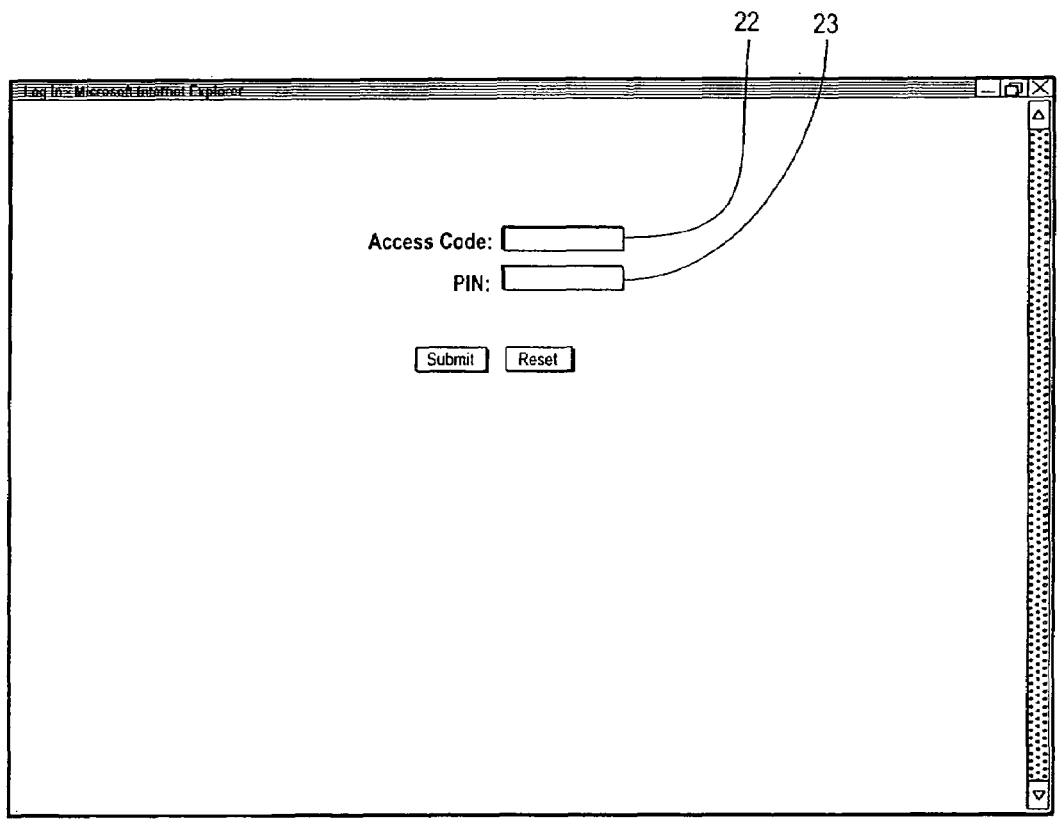
FIG. 3 shows the login page for a web-based version of the invention.

FIG. 2, shows a flowchart of a possible presentation of the system to the user, in the currently preferred embodiment. The user enters the service by accessing a login page 5 via the user's web browser. On that page, one possible example of which is shown in FIG. 3, the user enters the user's access code 23 and PIN 24. If the user is a prospective customer or has no access code, the user is given a promotional tour of the features of the service. If the user is an existing customer, the user is redirected to the user main menu page. FIG. 3 shows one example of a possible login page.

If the user is a customer, the customer will be redirected to the customer main menu 7 instead of the tour. Once on the customer main menu page, which is shown on FIG. 4, the user is permitted to follow links in order to rate and schedule shipments 8, view shipment logs 9, view management reports 10, or review invoices 11. Links for each choice are provided on the main menu page. If the PIN 24 entered by the user on the login page indicates that a sub-account is to be used, access will be granted only to the sub-account's information.

Figure 4:
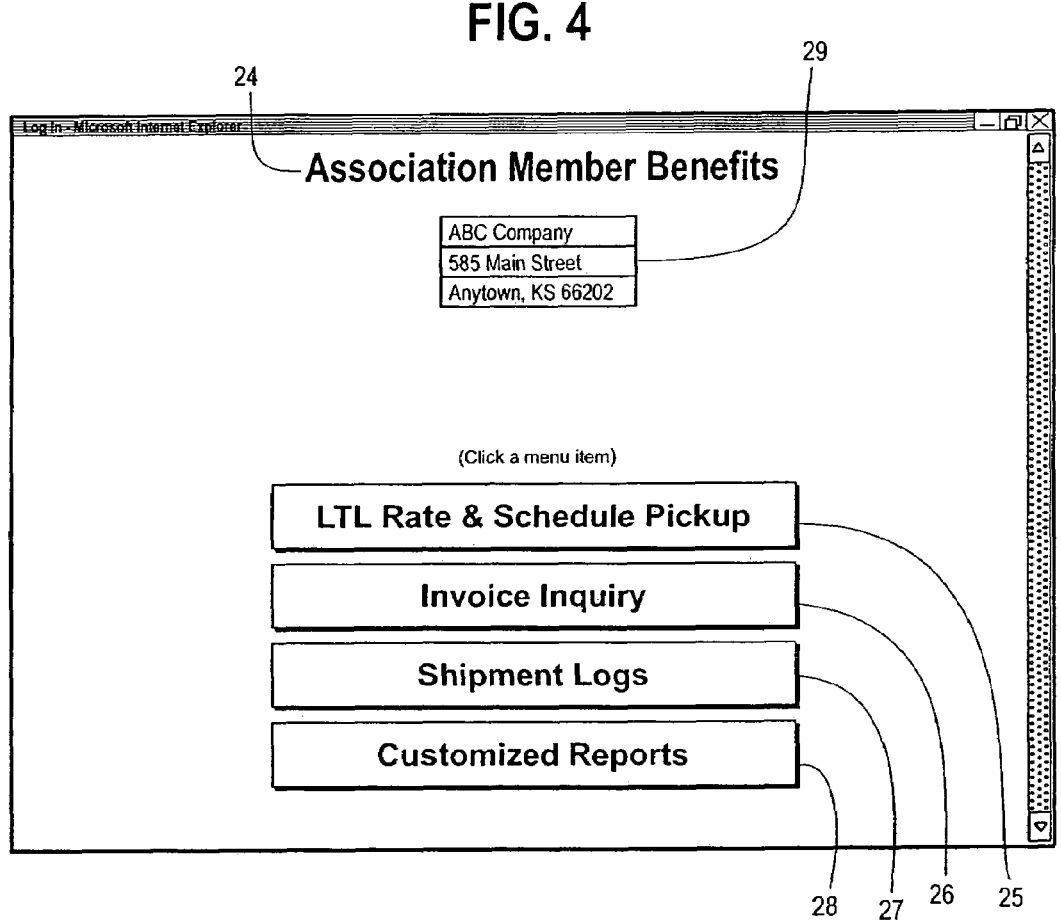
FIG. 4 shows the main menu page for a web-based version of the invention.

As seen in FIG. 4, every page which a user may visit may be custom branded with a special logo in the affinity indication portion 24 of the page. This logo will be based on the user's affiliation. For example, if the user is a member of the ABC Association, which the service determines based on the user's master account, the ABC Association's logo or title will be placed in the affinity indication portion 6 of each page during all access. This is true even of the tour, if the tour is the result of access based on a promotional flyer with a user code. The user enters the code, which begins the tour. The tour will be affinity branded based on the code entered. This permits affinity groups to market specifically to their members, with every aspect of the web site branded to their group.

If the user chooses to rate and schedule shipments, the user will be led through a series of pages for rating, scheduling, invoicing, and confirming the shipment. First, the user will be directed to the rate page 8, where the user may rate a shipment or a plurality of shipments. The user will then be allowed to schedule any of the shipments, and will be led through the scheduling process for each shipment.

For each shipment, the user will be led through the following process, and may either confirm and send or cancel each shipment:

The user will be directed to the Schedule 1 page 12, where the user may enter new shipping information or recall old shipping information in order to schedule the shipment or shipments. If the user enters new information, the system will store the new shipping information for future recall during the Schedule 2 13 phase, as the user is directed to the additional services page at Schedule 3 13, where the user may choose accessorial services for each shipment. After choosing accessorial services, the user will be directed to choose a product description for the shipment on the product description page in the Schedule 5 phase 15. The user may add or re-use product description, and the service will save any new product designations for future use. The user then schedules the pickup, on a scheduling page in the Schedule 6 phase 16. The user may create an invoice to bill the user's customer in the Schedule 6 phase 17, which the user may print out directly from the browser during the Print Invoice phase 18. If the user confirms the shipment on the confirm shipment page 19, the user prints a Bill off Lading (Print BOL 20), the system faxes a Bill of Lading to the shipper if the shipper is different from the user, and the user may begin scheduling the next rated shipment, if any.

If the user has completed scheduling or canceling all rated shipments, the user is returned to the Customer Main Menu 7.

I now describe the individual pages of the system, commencing with the scheduling pages. These pages are described in the same order they were discussed, and appear in FIG. 2.

Figure 5A:
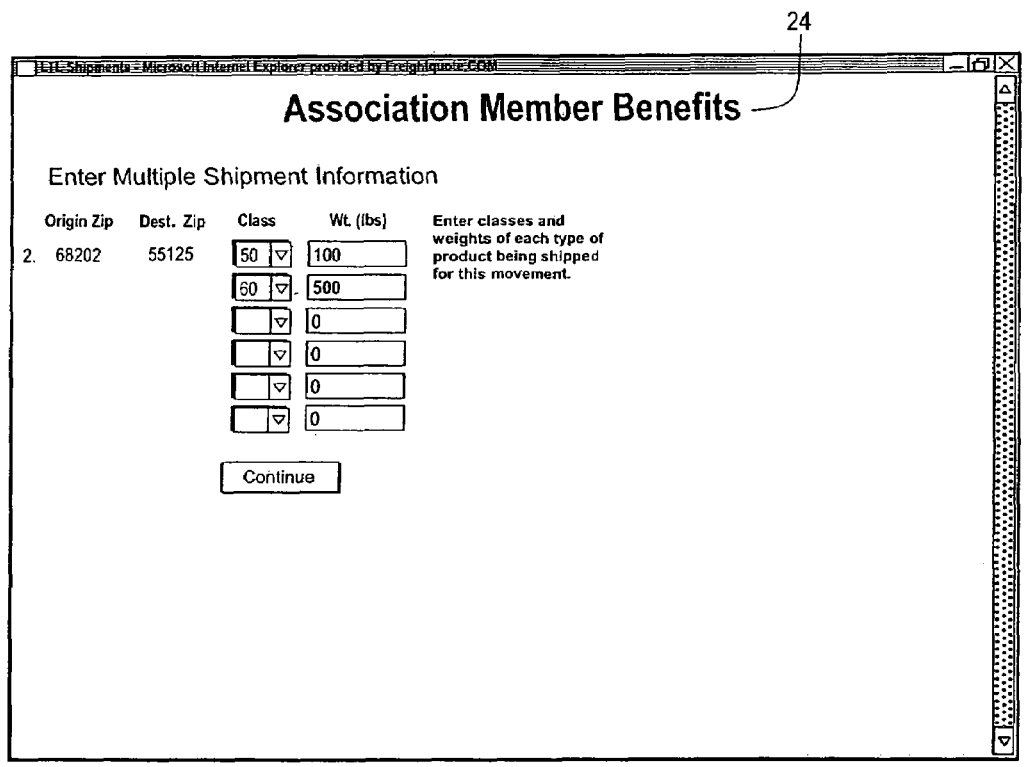
FIG. 5A shows an example of a multiple class entry page.

FIG. 5 shows a web page designed for rating a single shipment or a plurality of shipments. For each shipment the user wishes to have rated, the user may enter the origin zip into an origin zip entry box 30, the destination zip into a destination zip entry box 31, select a class from a class drop down box 32, and enter the total weight in a total weight entry box 33. If the user chooses 'multiple' from drop down box 32, the user will be redirected to the multiple shipment information page (FIG. 5A). Once the user has entered the multiple class information for the shipment, the user will be returned to the rating page shown at FIG. 5, which will now show the 'multiple' class for the shipment, and the total of the weight information entered in the multiple shipment information page. Upon entering all of the information and pressing the rate button 34, the system will rate the shipment according to the rating system described below (and shown in FIG. 17), and report the carrier in the carrier column 36 and that carrier's rate in the price column 35, along with the estimated time of transit in the estimated transit column 37. When the user has rated all the shipments desired, up to a maximum of ten in this embodiment, the user may choose which, if any of the shipments, to schedule. The user clicks 'yes' or 'no' in the radio buttons 39 in the arrange pickup column 38. Upon clicking the next button 40, the scheduling process will begin.

Figure 6:
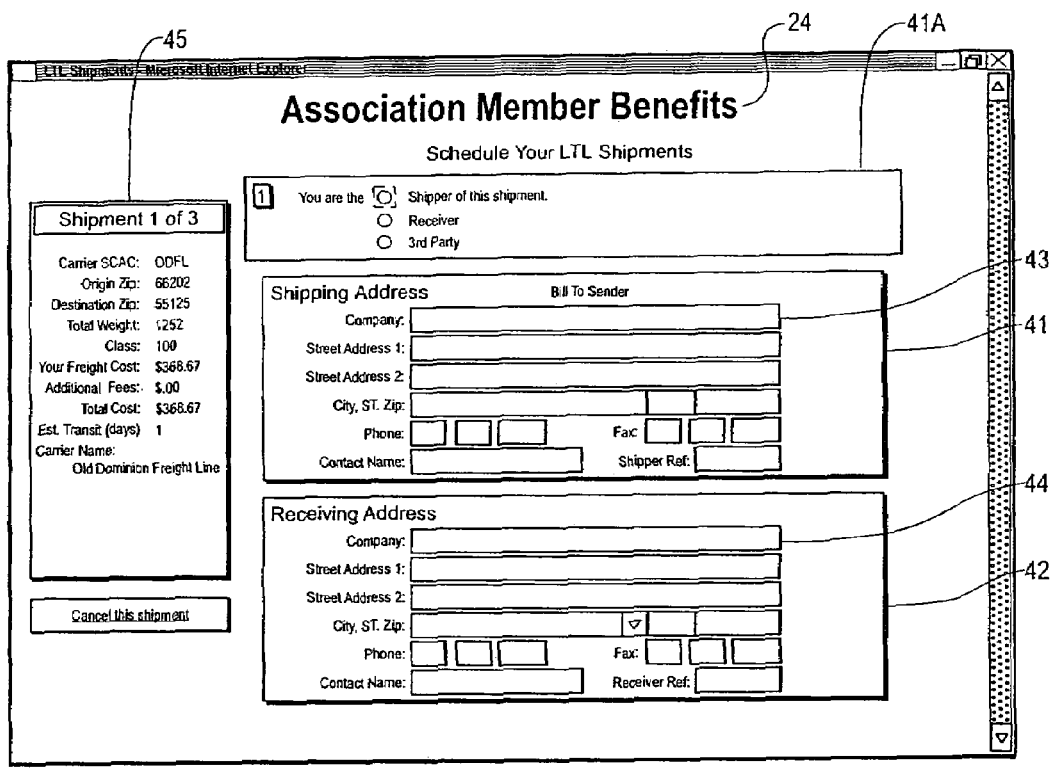
FIGS. 6 and 6A show the address information page for a web-based version of the invention.
Figure 6A:
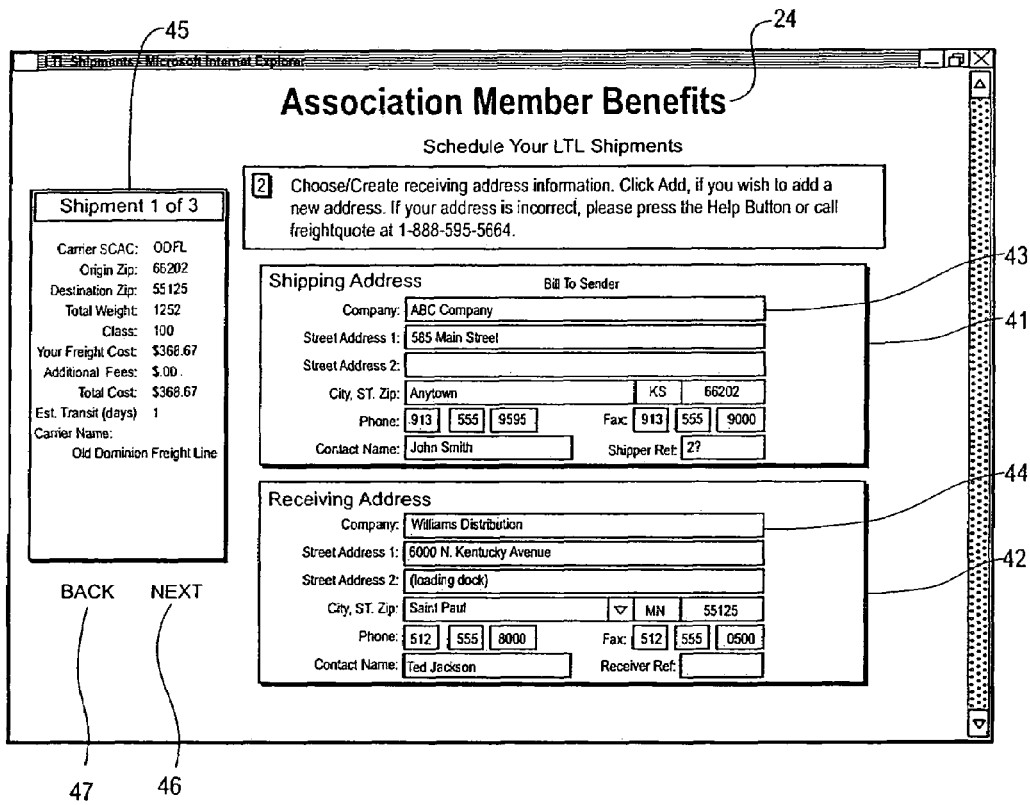

For each shipment, the user will follow the scheduling process, as described above, and shown in FIG. 2. The first page shown to the user is the address information page, shown in FIG. 6. This page permits the user to enter new addresses or access existing addresses in any convenient format. First the user will choose whether the user is the shipper, receiver, or a third party for the shipment, using radio button 41A. At FIG. 6A, the page is shown for the user as shipper. The user will enter or recall address information for the shipper and the recipient of the shipment. In the current preferred embodiment, existing addresses may be accessed through a drop down box associated with company name entry boxes 43 and 44. These entry boxes permit the user to type in a new name, or, if existing companies are stored in the database server 2, to access existing addresses by using the drop down box. If the drop down box is used, the remainder of the information in either shipping address box 41 or receiving address box 42 will be entered automatically by the web server 1 and database server 2. Any format may be used for address information. The currently preferred embodiment suggests a format of Company, Street Address 1 and 2, City, State, Zip, Phone, Fax, Contact Name and Shipper Reference. The database of address information stored in the database server 2 stores the information by user and sub-account, if used, and permits the system to provide address storage to each user and sub-account.

As an additional verification step to reduce shipping errors, the receiving address data such as the zip code is compared against stored data for reconciliation. If the newly inputted information matches previously inputted information, no action is taken by the system. On the other hand, if an inconsistency is detected, such as an incorrect street number or zip code, the user will be prompted to verify that the correct information has been supplied. This may be done by simply having the user re-input the information or displaying the previously entered information so that a comparison may be made. Of course, the system may also prompt the user to select between the stored data and the new user input to make any needed reconciliation. Moreover, the system may also be programmed to allow the user to further edit the information stored by either editing the stored data or using the new user input as further new user input.

The shipment information box 45 permits the user to see information sufficient to indicate which shipment is currently being scheduled. In the currently preferred embodiment, the information presented is the carrier and carrier SCAC, origin and destination zip codes, weight, class, cost, fees, and estimated time of transit. It may readily be seen that the information presented need only be sufficient to identify the shipment, and need not necessarily be the same as that shown in the currently preferred embodiment. If the user is the shipper or the recipient, the user's information will automatically be shown in boxes 41 or 42, as appropriate. If the user is a third party, the user's address information may be shown in a third box, and the user will choose or enter address information for both boxes 41 and 42. The next button 46 allows the user to proceed to the accessorial services page and the back button 47 allows the user to return to the rating page.

Figure 7:
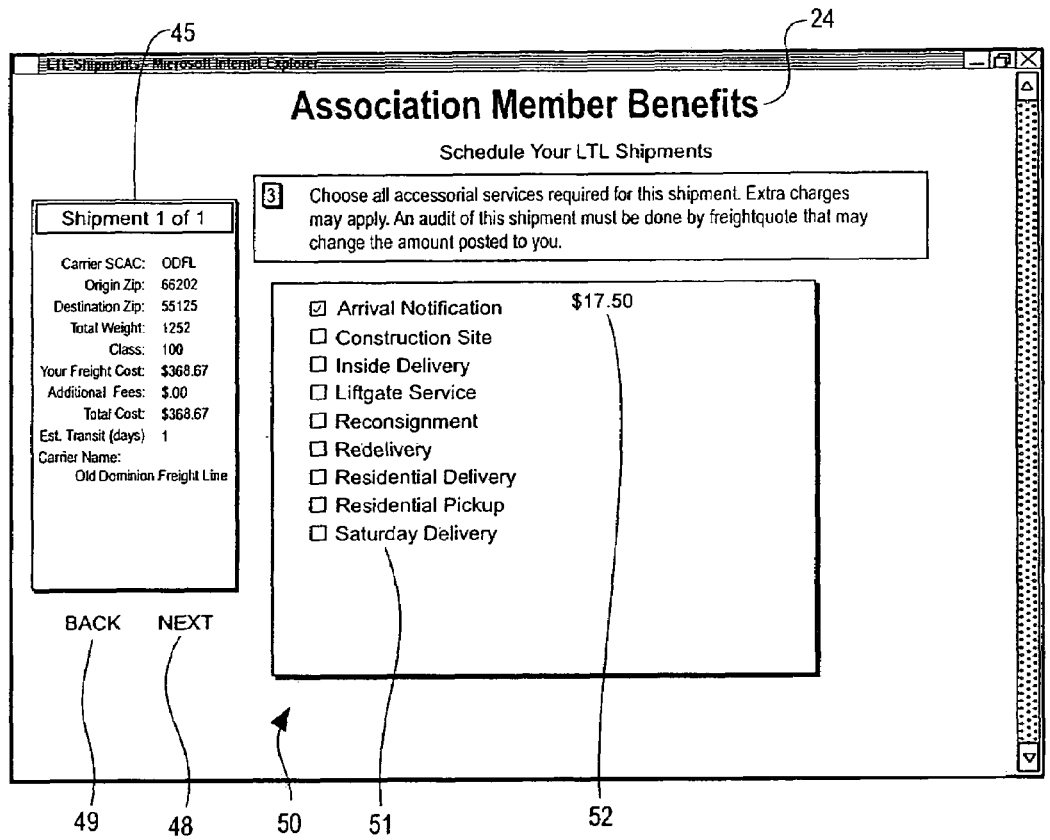
FIG. 7 shows the accessorial services page for a web-based version of the invention.

The accessorial services page is shown as FIG. 7. The same information is shown in the shipment information box 45. The check boxes 50 each correspond to an accessorial service. It can readily be seen that the accessorial services 51 may be any set of accessorial services commonly offered by carriers. Upon the user checking one of the check boxes 50, the corresponding additional charge 52 will be shown next to the corresponding accessorial service description 51 and, in the currently preferred embodiment, added to the Additional Fees section of shipment information box 45. The charges are determined by the service's database server 2, and displayed by the web server 1. Thus, it is readily seen that the user, at all times, can see the exact price currently offered by the service for the shipment.

It is in this area of accessorial service charges that frequent billing errors occur. Billing errors of this type are so prevalent in the shipping industry, as a result of customer error or error by the shipper in properly inputting the data on the order, that an entire service industry to audit these types of errors has been created. These types of companies compare the invoices to the actual shipping data to determine if over-charges had been made. For example, charging for an accessorial service not provided or ordered. It is estimated that the these types of errors are in the hundreds of millions, if not more, given the size of this industry.

To reduce customer related input errors from occurring, the system may be programmed to require the user to address each accessorial service 51 listed. In operation, each check 50 is sequentially addressed with the user being required to indicate whether or not each accessorial service is required. Once each check box 50 is addressed, the user may then click the next button 48 to proceed to the product description page, or the back page button 49 to return to the address information page. Because of the importance of obtaining accuracy with respect to the accessorial services, the system may be programmed to prevent the user from moving further back or forward through the system until each accessorial service is addressed. In summary, it has been found that billing errors associated with accessorial services may be reduced by requiring a user to accept or decline each service before permitting the transaction to be completed.

In addition, a further benefit may be provided to the user in the form of a list or summary of accessorial services selected and services rejected. This is yet another verification step that has been found to reduce errors. As a further requirement, the system may also be programmed to prevent the transaction from being completed until at least one element of the accessorial service list has been selected by the user, or that no service has been affirmatively selected by the user. Lastly, the system may also be programmed to prevent a transaction from being completed until all listed accessorial services have been addressed by the user.

Figure 8A:
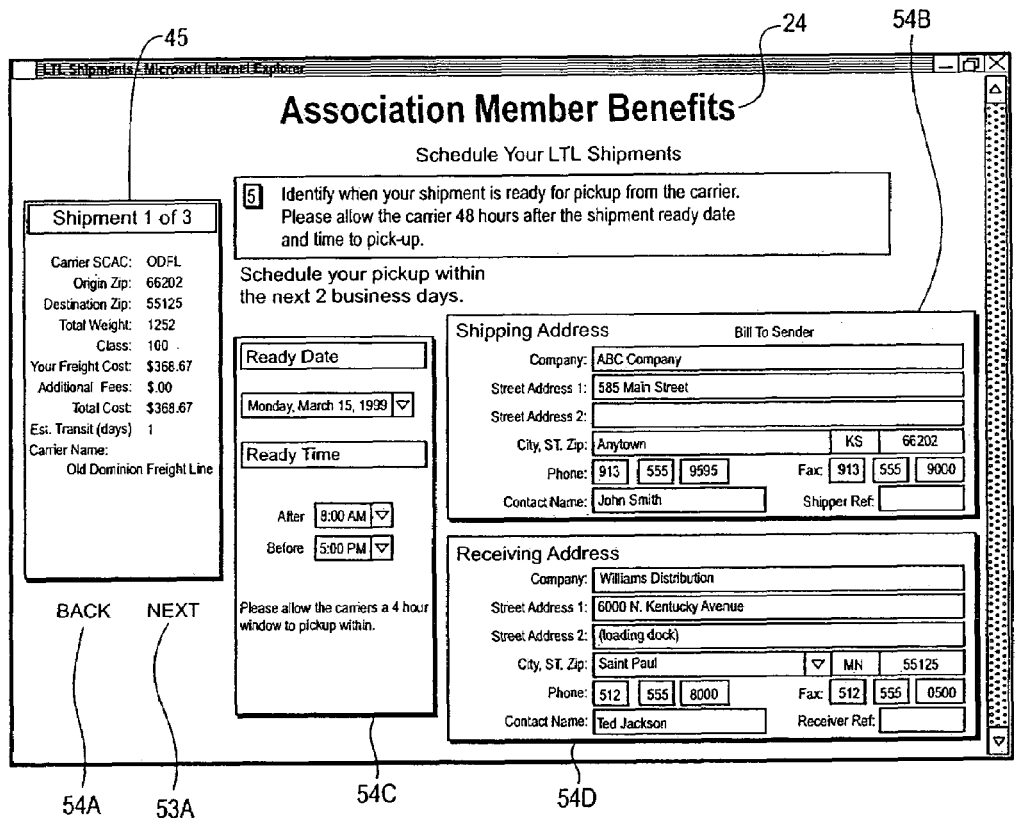
FIG. 8A shows a shipment ready page for a web-based version of the invention.

The product description page is shown at FIG. 8. This page allows the user to enter product descriptions for each class of product in the shipment. A product description drop down box 55 permits the user to use already available descriptions, or to store new descriptions in the database. If the user wishes to use a pre-existing description, the user simply chooses it using the product description drop down box 55. If the user wants to add a new description, the user simply chooses 'Add a Product' or a similar designation from product description drop down box 55, and types in the new description. The user will then choose an NMFC number to associate with the product, and enter the NMFC number in NMFC number box 58. If the user uses a pre-existing product description, the service will automatically use the NMFC number associated with that description in the database. Class and weight are shown in class display column 56 and weight display column 57. Class and weight are both shown for each portion of the shipment based on the information from the shipment rating page. The user may also check a hazardous materials check box 59 for any portion of the shipment. The price of the shipment will be automatically recalculated by the service and displayed in shipment information box 45. The user will also indicate, from a package type drop down menu 60 the type of package used with each portion of the shipment, and in a number of packages entry box 61 the number of packages of each type. Once all of these decisions have been made for each portion of the shipment, the user may click on next button 53 to proceed to the shipment ready page. The user may also click, at any time, on back button 54 to the accessorial services page. The shipment ready page (FIG. 8A) simply permits the user to indicate, via drop down boxes 54B, 54C, and 54D, the time the shipment will be ready for pickup. Any equivalent method could be used. Next button 53A allows the user to proceed to the third-party invoice page, while back button 54A returns the user to the product description page.

The third-party invoice page is shown at FIG. 9. This page allows the user to prepare an invoice for a third-party for each shipment scheduled, if desired. If the user wishes to print a third-party invoice, he may do so using invoice radio button 62. Using discount radio button 63 the user determined whether or not to pass on the discounts received from the service to the customer. In third-party address box 64, the customer chooses or enters address information for the third-party to receive the invoice, in the same manner as shown above. As above, the service permits the user to recall old third-party information by accessing the database server 2 via a drop down menu or enter new address information. Once the user has completed any necessary entries on this page, the user may click on next button 66 to proceed. The user may also click, at any time, on back button 67 to return to the shipment ready page.

Figure 10:
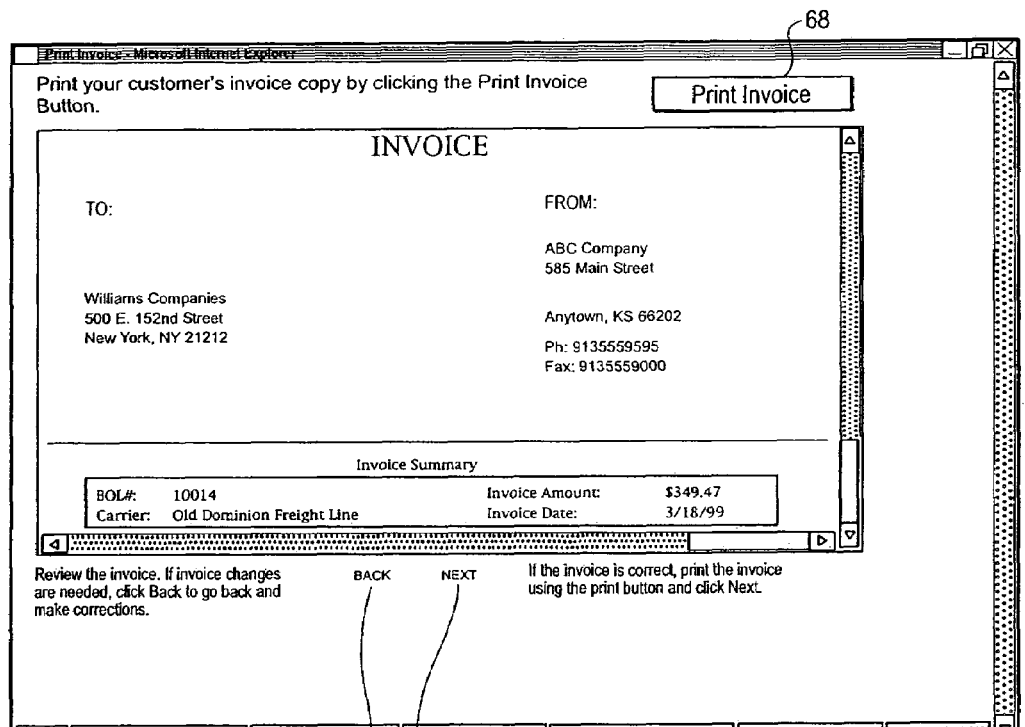
FIG. 10 shows a specimen invoice.

If the user has chosen to print a third party invoice, upon clicking next button 66, the user will be presented with a specimen invoice, which the user may then print. Such a specimen invoice is shown at FIG. 10. The user may click on print button 68 to print the invoice, then next button 69 to proceed to the complete shipment page. The user may also click on back button 70 to return to the third-party invoice page.

The complete shipment page is shown at FIG. 11. This page presents the user with a final opportunity to cancel the shipment. If the user clicks on cancel movement button 71, the user will cancel the shipment and proceed to scheduling the next shipment or return to the main menu if there are no further shipments to schedule. If the user clicks on ok button 72, the shipment will be ordered, and the user will be presented with a Bill of Lading to review. A sample Bill of Lading page is shown at FIG. 12. Any reasonable bill of lading format could be used. In this example, when the user clicks on print button 73, a bill of lading will be printed on the user's printer. The user may print as many copies of the BOL as needed, and then click on the next button 74 in order to proceed. If the user has rated shipments remaining to schedule, the user will be returned to the address information page to schedule the next shipment. If there are no remaining shipments to be scheduled, the user is returned to the main menu page.

There are three options other than rating and scheduling shipments available to the user from the main menu page (FIG. 4). If the user clicks on invoice inquiry button 26, the user will be redirected to the invoice inquiry page (FIG. 13). If the user clicks on shipment logs button 27 the user will be redirected to the tracking shipments page (FIG. 14). If the user clicks on customized reports button 28 the user's browser will be redirected to the customized reports page (FIG. 15).

Each of these pages performs a different function. The invoice inquiry page (FIG. 13) permits the user to review the status of all service invoices. This permits the user to view the current status of their account with the service. Invoices in the currently preferred embodiment are displayed by invoice number, and show the date of the invoice, the due date, the prior balance, payments or credits, and the total due. Any reasonable alternate format could be used to present the data, and the data could be presented in any reasonable tabular format. The scroll bar 75 in this embodiment permits the user to scroll through the available invoices. The data is stored on the database server 2. Upon receipt of payment, the service will update the database server 2 to reflect the payment. This can be performed by a direct database operation, or any software adapted for the purpose of making changes to the database. A separate administrative web page, program, or server are three alternatives available in the present state of the art.

The shipment tracking page (FIG. 14) permits the user to review the status of all shipments made by the user. This permits the user to view the current status of their shipments. Shipments in the currently preferred embodiment are initially displayed by the BOL number generated by the service, and the display shows the SCAC of the carrier performing the shipment, the date of the pickup, the date and time of the delivery, and the name of the recipient of the shipment. Any alternate format could be used to present the data, and the data could be presented in any format. The currently preferred embodiment displays the data in a tabular format. The scroll bar 76 in this embodiment permits the user to scroll up and down through the available shipments. In addition, if the user clicks on any of BOL number column heading 77, SCAC column heading 78, status column heading 79, pickup column heading 80, delivered column heading 81, signature column heading 82 or time column heading 83, the database server 2 will sort the shipments by the data contained in the column, and web server 1 will display shipment data in the resulting order. The data is stored on the database server 2. Upon receipt of new information, the service will update the database server 2 to reflect the payment. This can be performed by a direct database operation, or any software adapted for the purpose of making changes to the database. A separate administrative web page, program, or server are three alternatives available in the present state of the art. In addition, the carriers themselves could be given limited access to the database via a customized web page to update information for shipments made by each carrier. Print BOL button 84 permits the user to reprint the BOL for a selected shipment by clicking on the shipment's row and then clicking on print BOL button 84. Print POD button 85 permits the user to print a POD report for a given shipment, again by clicking on the shipment's row and then clicking on print POD button 85.

The customized reports page (FIG. 15) permits the user access to cost reports, tracking reports, and custom reports for an account or sub-account. The user may choose any kind of report to generate or to schedule. If the user clicks on cost report button 86, 87 or 88, the user will be given the opportunity to choose a location from the database of all locations shipped to or from. After choosing a location, the report will be printed, or scheduled to be run at a future time. By clicking on cost report button 86, a report may be generated and may be printed for all shipments not yet invoiced to or from the location chosen. An example of the currently preferred run cost report page is shown at FIG. 15A, and a sample cost report is shown at FIG. 15B. By clicking on cost report button 86, the user is redirected to a run cost report page. After filling in the information requested in origin zip box 87A and destination zip box 87B as well as date range start box 87C and date range stop box 87D, the user may indicate which method the user prefers to receive the report by, fax or email by clicking on radio buttons 87E. After entering the destination information in box 87F or 87G, a report is generated when the submit button 87H is clicked by the user, and the report is delivered via the method indicated by the user for any invoices in the date ranges chosen by the user for shipments to or from the location chosen. The report may be of any reasonable format, but the currently preferred format is shown in FIG. 15B. The reset button 87I clears all fields. When the user clicks on cost report button 87, the report may be generated for all shipments already invoiced to or from the location chosen, using a run report page similar to that shown in FIG. 15B. When the user clicks on cost report button 88, either of these reports may be scheduled to be run at a future time and shipped to the user via facsimile or e-mail, using a scheduling report page similar to the one shown in FIG. 15B, with the addition of date and time entry boxes to allow scheduling a future report run. The service will fax the report or e-mail the report over the distributed network at the time scheduled, automatically.

Likewise, if the user clicks on tracking report button 89, 90 or 91, the user will be given the opportunity to choose a location from the database of all locations shipped to or from. After choosing a location, the report may be printed, or scheduled to be run at a future time. By clicking on tracking report button 89, a tracking report may be generated and may be printed for all shipments not yet invoiced to or from the location chosen. By clicking on tracking report button 90, a report is generated and may be printed for all shipments already invoiced to or from the location chosen. When the user clicks on tracking report button 91, either of these tracking reports may be scheduled to be run at a future time and shipped to the user via facsimile or e-mail. A sample of a tracking report page is shown at FIG. 15C, which operates similarly to the cost report pages described above, again with the addition of date and time entry boxes for future scheduling. An example of a tracking report in the currently preferred embodiment is shown at FIG. 15D. Both the tracking reports and the cost reports may be in any reasonable format.

As is shown, it is also possible to permit custom reports to be designed or run, using custom report buttons 92, 93 or 94. These buttons may permit the user to design a custom report based on any of the data stored in the database. These custom reports can then be run just like the tracking and cost reports, either instantly or on a scheduled basis, with facsimile or e-mail delivery. Additionally, the user could request a special report to be designed, which would then be accessed via these boxes, similarly to the reports described above.

Figure 16:
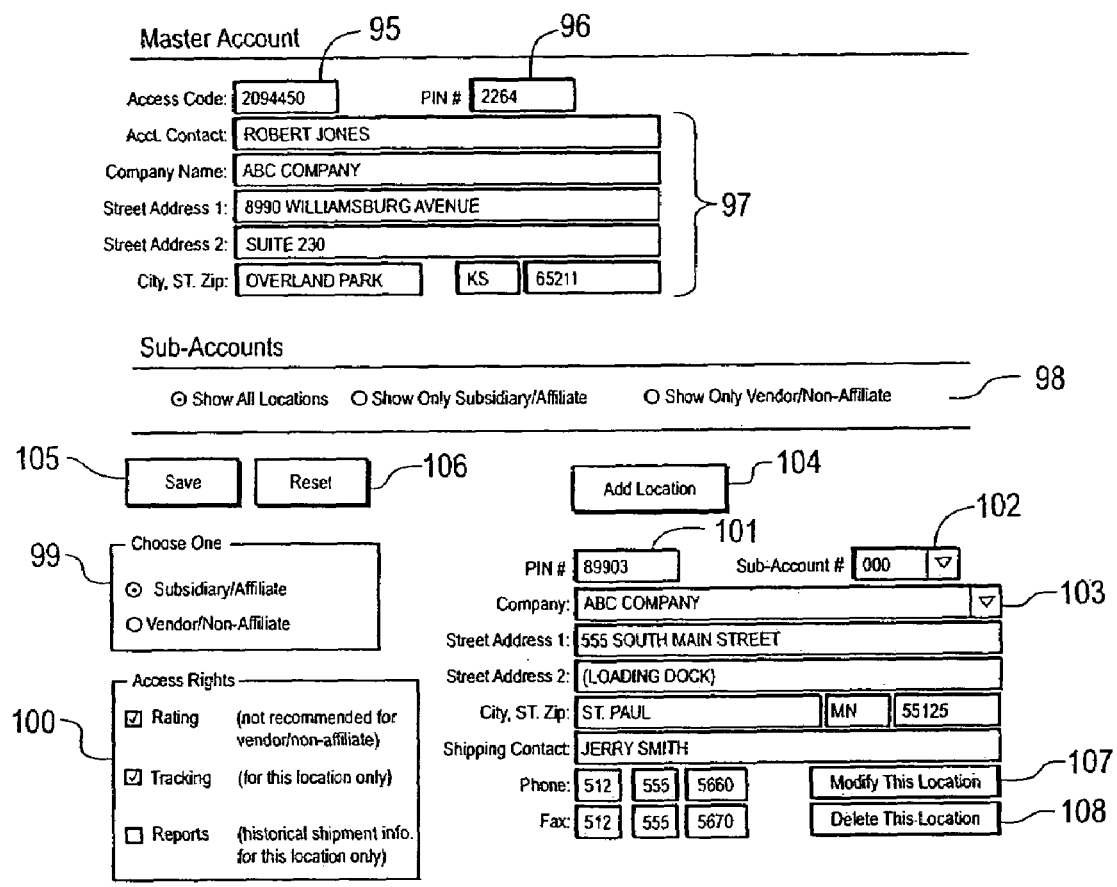
FIG. 16 shows the manage sub-accounts page for a web-based version of the invention.

The manage sub-accounts page (FIG. 16) may be reached by the user by directing their browser to the enrollment page. The manage sub-accounts page permits the user to create sub-accounts for master account information entered in master account information box. The user enters their access code in access code box 95 and their PIN in PIN box 96. The service will recall and display the user's information in user information box 97. The user may then access the sub-account management functions of the page. These may be presented in any reasonable format. In the currently preferred embodiment, the sub accounts are managed as follows:

By using the sub-account drop down box 102, the user may access and alter already existing sub-accounts. Once the user has selected a sub-account using drop down box 102, the service will permit access the sub-account information, recalling it from the database server 2. Each sub-account may be allowed to rate and schedule, track, or view (depending on the settings of check boxes 100, set by the user) reports for any set of locations in the database accessible by the user's master account. The user selects those locations for desired access and adds them using the add location button 104. The service then modifies the database to reflect the sub-accounts access to the location added. The user may also alter or delete locations from the sub-account using the modify location button 107 and the delete location button 108. By re-entering the PIN for the sub-account in PIN box 101 the user may alter the PIN for an individual sub-account. The status of the sub-account may be changed or set using status radio button 99, and set to either subsidiary/affiliate or vendor/non-affiliate. Once the user is done altering the sub-account, the user presses the save button 105, and the service updates the database to reflect the changes or additions made by the user. The reset button 106 permits the user to reset the page to a neutral setting. Once the user has finished, the user may redirect their browser to another page.

Figure 17:
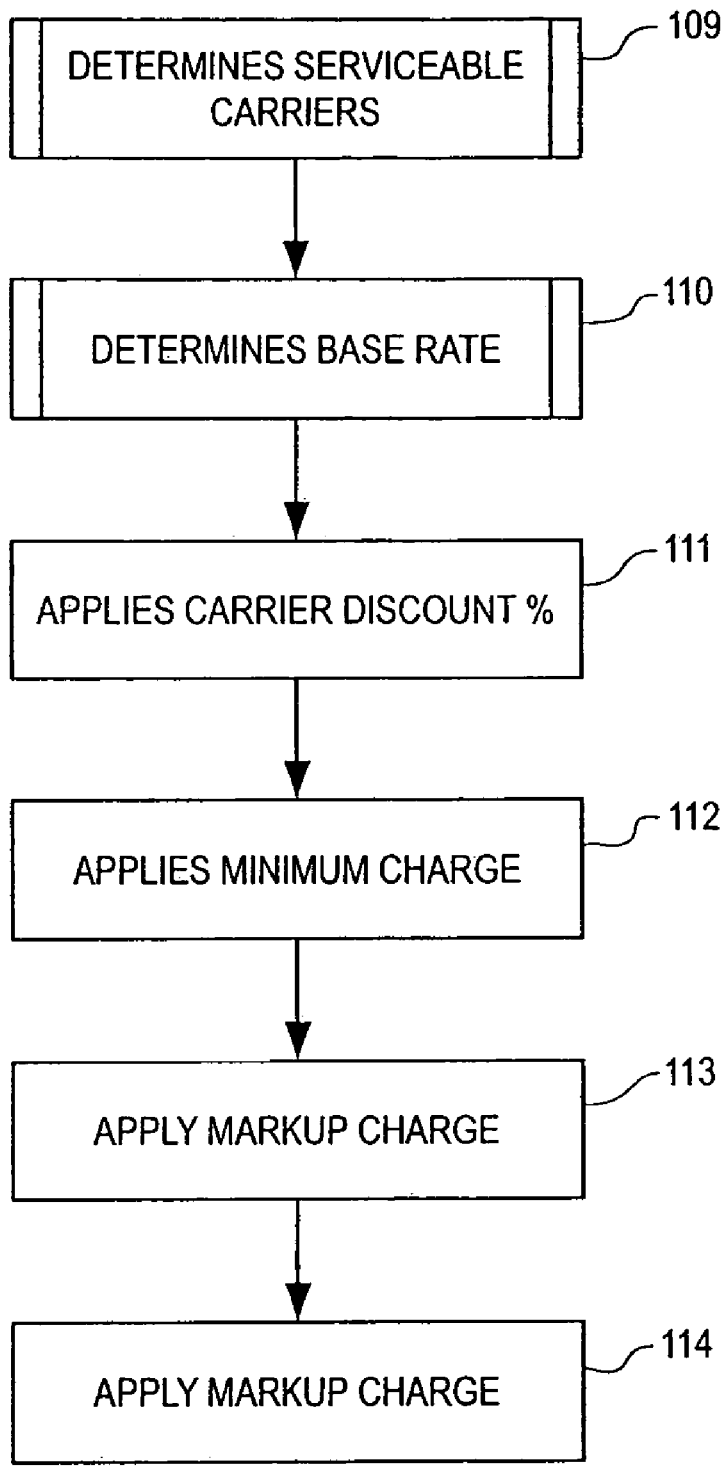
FIG. 17 shows the LTL rating process.

The LTL rating process is described in the flowchart shown in FIG. 17. The LTL rating process is managed by the service. Once the user has input the rating data, the user chooses to rate the service by clicking 'rate', as described above. The database server 2 first runs a query against the database of carriers providing service to the zip codes chosen by the user, or determines the serviceable carriers 109. The database server 2 then determines the base rate 110 for each carrier, which may be negotiated by the user's affiliation group or by the service. This step is performed for each serviceable carrier as determined above. The database server 2 then applies the appropriate carrier discount 111, again determined from the database information as appropriate for the user's affiliation group or as negotiated by the service. This step is again performed for each serviceable carrier. If the resulting charge for the carrier is below their minimum charge, the service will apply the minimum charge instead of the calculated charge at the apply minimum charge step 114. This step is also performed for each serviceable carrier. Finally, the system will apply the markup associated with the user or the user's affiliation group for each serviceable carrier at the apply markup step 115. The resulting carriers and rates will then be displayed to the user by the web server in the form of a drop down box, as shown above.

It will be apparent to those of ordinary skill in the art that many changes and modifications could be made while remaining within the scope of the invention. It is intended to cover all such equivalent methods or systems, and to limit the invention only as specifically delineated in the following claims.

It is readily apparent that the claimed invention may be embodied in a number of manners. Though the disclosed embodiment, and the currently preferred embodiment, is a series of web pages run on a web server 1 and a database server 2, the invention could be a network-based program run over a distributed system, a set of web pages run on a single server or distributed server, or any other alternative which may be immediately apparent to one skilled in the art, and that advances in distributed networks may make possible embodiments which are not presently available without making substantial changes to the invention.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

What is claimed is:

1. An internet-based system for ordering freight services from any internet connected computer comprising a server computer system which includes:
   (i) a server computer system, said server computer system providing one or more pages which, when viewed on, any internet connected computer allows a user to enter a freight delivery service request including at least source and destination zip codes, class, weight and accessorial services;
   (ii) said server computer system further providing one or more pages which, when viewed on any internet connected computer, allow a user to schedule a shipment including at least a shipping and receiving address, a ready date, invoice information and member discount information; and
   (iii) said server computer system further providing one or more pages which, when viewed on any internet connected computer, permit a user to review status of shipments made by the user;
   (iv) said server computer system further providing one or more pages which, when viewed on any internet connected computer, permit a user to obtain actual quotes for shipping from a plurality of carriers;
   (v) said server computer system further including storage for a database of accessorial services offered in conjunction with a freight shipment process, said freight shipment process including quoting, ordering and completing said shipment; and
   (vi) said server computer system further providing a web site with a plurality of web pages, one or more of said web pages sequentially displaying a plurality of accessorial services and requiring the user to address each of said accessorial services offered to accept or decline each of said accessorial services before completing said freight ordering services, thereby providing information about accepted or declined accessorial information within the freight shipment process to provide an accurate quote.

2. The internet-based system of claim 1 where the server computer system further comprises one or more pages which, when viewed on a user computer system, allow the printing of a bill of lading.

3. The internet-based system of claim 1 where the server computer system further comprises one or more pages which, when viewed on any internet connected computer, permit the user to create an invoice to send to another party.

* * * * *